(12) United States Patent
Harkcom et al.

(10) Patent No.: US 8,746,725 B2
(45) Date of Patent: Jun. 10, 2014

(54) DRAWBAR HITCH ADAPTER PROVIDING ROLL AND PITCH FREEDOM

(75) Inventors: Melanie W. Harkcom, New Holland, PA (US); Roger Huggard, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 144 days.

(21) Appl. No.: 13/309,515

(22) Filed: Dec. 1, 2011

(65) Prior Publication Data

US 2013/0140792 A1    Jun. 6, 2013

(51) Int. Cl.
  *B60D 1/14*    (2006.01)
(52) U.S. Cl.
  USPC ........................................................ 280/492
(58) Field of Classification Search
  USPC .......................................... 280/292, 293, 294
  See application file for complete search history.

(56) References Cited

U.S. PATENT DOCUMENTS

| | | | |
|---|---|---|---|
| 1,940,061 A | 12/1933 | Paul | |
| 2,591,624 A | 4/1952 | Siebels | |
| 2,746,770 A | 5/1956 | Sorensen et al. | |
| 2,826,130 A | 3/1958 | Collins | |
| 2,973,817 A | 3/1961 | Monthei et al. | |
| 3,741,312 A | 6/1973 | Hayter | |
| 4,095,652 A | 6/1978 | van der Lely | |
| 5,386,680 A | 2/1995 | Friesen | |
| 5,531,283 A | 7/1996 | Austin et al. | |
| 6,328,327 B1 | 12/2001 | Ligouy | |
| 6,776,432 B2 | 8/2004 | Harkcom et al. | |
| 6,779,808 B2 * | 8/2004 | Connor | 280/494 |
| 2003/0090084 A1 * | 5/2003 | Goby | 280/493 |

FOREIGN PATENT DOCUMENTS

EP    285790 A1    10/1988

* cited by examiner

*Primary Examiner* — Kevin Hurley
(74) *Attorney, Agent, or Firm* — Patrick M. Sheldrake

(57) ABSTRACT

An adapter for connecting a agricultural implement swivel hitch to a drawing hitch on a towing vehicle that enables relative pitch and roll movement between the implement and vehicle at a single, pinned joint. Elongated openings in a first portion of the hitch adapter receive a transversely aligned connection pin. The openings are sized to allow limited pin angular movement about a vehicular roll axis. A second portion of the hitch adapter is also connected to the connection pin and configured to allow limited relative angular movement about a transverse pitch axis. The connection between the first and second portions at the connector pin allows relative angular movement therebetween about generally co-planar pitch and roll axes. The connector pin is formed from a softer material than the surrounding first and second portions thereby providing an inexpensive and easily replaceable weak link in the hitch adapter assembly.

13 Claims, 4 Drawing Sheets

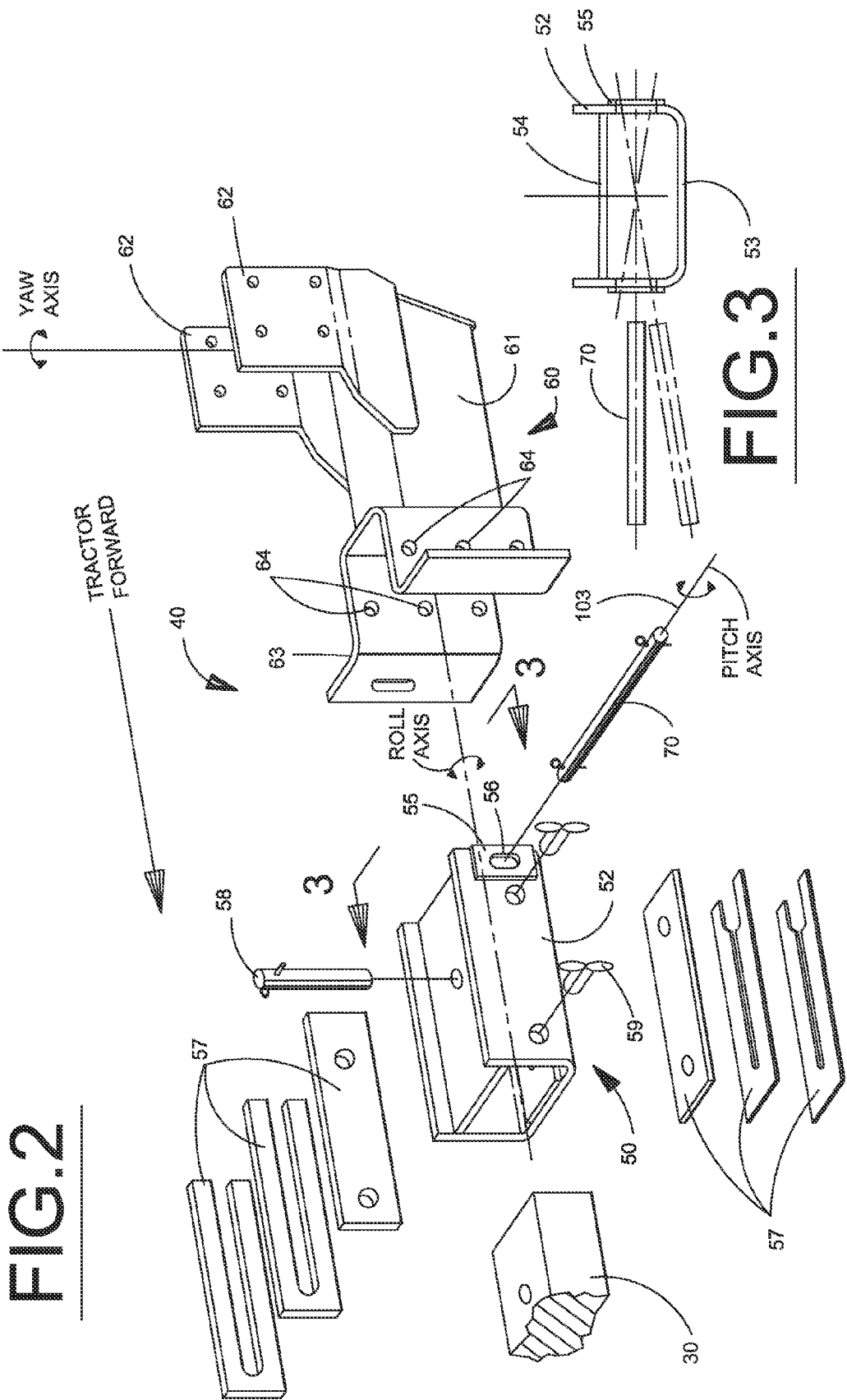

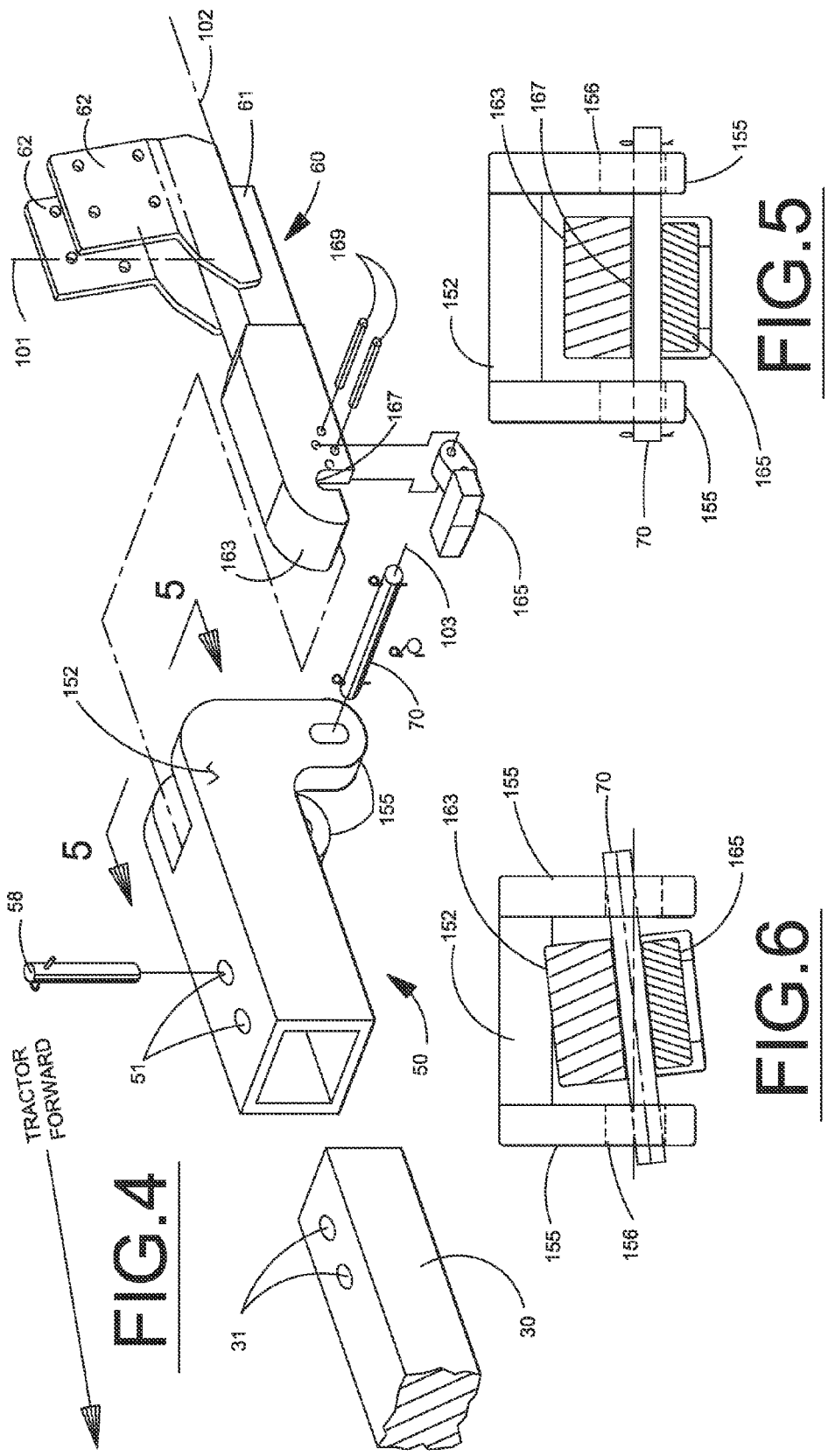

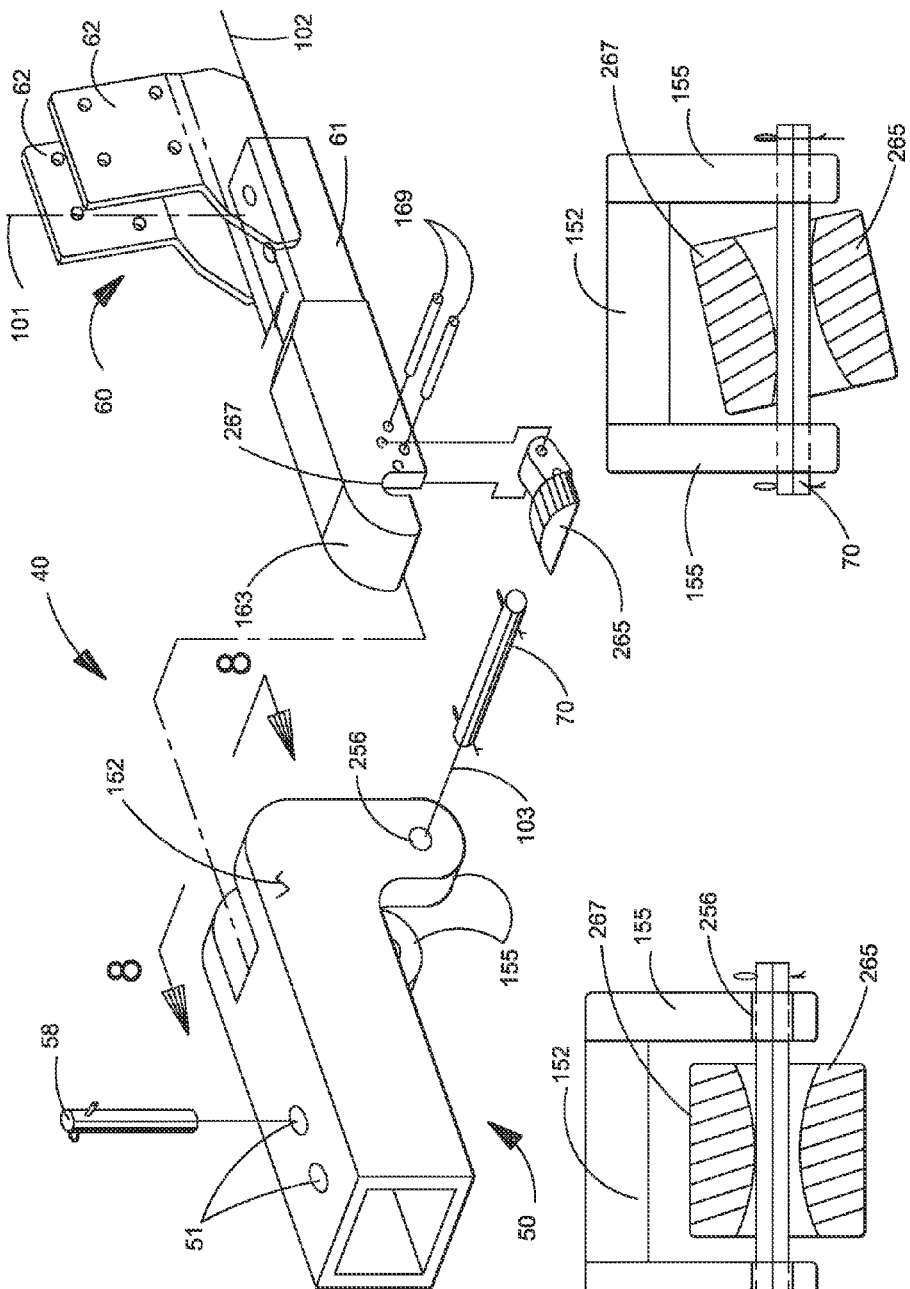

DRAWBAR HITCH ADAPTER PROVIDING ROLL AND PITCH FREEDOM

BACKGROUND OF THE INVENTION

This invention relates generally to agricultural tractors towing implements, and, more particularly, to a connection mechanism for a tractor drawbar that provides roll and pitch freedom of movement between the tractor and the towed implement.

Pull type implements have been used in farming operations for decades. For example, the agricultural implement may be a mower designed to cut and process hay or other crops. The implement may also be configured as a forage harvester, hay recovery implement, baler, sprayer, or ground breaking implement. Typically, the implement is towed and powered by a towing vehicle such as a tractor. A powertake-off shaft (PTO) of the tractor typically provides mechanical power to the implement.

The implement is typically connected to the tractor by a pivoting draft tongue. There are two common methods of attaching the draft tongue of the implement to the towing vehicle. The first is to connect the draft tongue directly to the drawbar of the towing vehicle. A simple hitch pin can be used to drop through a hole in the draft tongue and into a hole in the towing vehicle drawbar. The implement tongue may also have a ball joint to allow freedom of rotation about the vertical (yaw) axis, the horizontal transverse (pitch) axis and the horizontal longitudinal (roll) axis or the hitch pin joint may be loose enough to allow the rotation needed. A shaft spans the hitch, extending from the tractor power take-off to the implement and must be sufficiently flexible to accommodate relative movement of the tractor and implement.

The second method is to use a swivel hitch on the implement. A swivel hitch incorporates the power take-off connection into the hitch connection, typically using a set of gearboxes, one above the other, with a connecting drive shaft between them. The gearboxes can swivel relative to each other. The relative swiveling motion becomes the vertical (yaw) axis of rotation. Typically, the swivel hitch has a frame member that pivots on the same yaw axis as the swivel gearboxes and connects to the three point hitch assembly or drawbar on the towing vehicle. The upper gearbox is fixed to the draft tongue. The lower gearbox and swivel hitch frame pivot relative to the upper gearbox and follow the tractor as it turns. Additional pivot members incorporated into the swivel hitch assembly allow relative pitch and roll freedom of movement between the tractor and the towed implement. One such mechanism is described in U.S. Pat. No. 6,776,432 issued on Aug. 14, 2004 to Harkcom, et al., the description portions of which are incorporated by reference herein.

Swivel hitches provide advantages over the standard pinned connection since the yaw axis is further behind the towing vehicle, allowing for much sharper turns than is permitted with a simple pinned drawbar connection. Swivel hitches are at a disadvantage since provisions for pitch and roll freedom must be incorporated into the hitch for each connected implement and present methods incorporating separate pinned joints for roll and pitch are not optimally economical.

It would be advantageous to provide an improved hitch adapter for use on a swivel hitch for an agricultural vehicle that provides for pitch and roll freedom of movement. Further advantages would be realized by a hitch adapter positioned on a tractor so that a single mechanism would provide freedom of movement for multiple implements connected by swivel hitch. Still further advantages would be realized by a hitch adapter that provides pitch and roll freedom of movement using a single pinned connection.

SUMMARY OF THE INVENTION

Accordingly, the present invention, in any of the embodiments described herein, may provide one or more of the following advantages:

It is an object of the present invention to provide a swivel hitch adapter for connecting a towed agricultural implement to a drawbar hitch on towing vehicle that provides pitch and roll freedom of movement.

It is a further object of the present invention to provide a swivel hitch adapter for connecting a towed agricultural implement to a drawbar hitch on towing vehicle that provides freedom of movement about co-planar pitch and roll axes.

It is a further object of the present invention to provide a swivel hitch adapter for connecting a towed agricultural implement to a drawbar hitch on towing vehicle that incorporates a sacrificial connection pin formed from a softer material than the hitch adapter.

It is a still further object of the present invention to provide a hitch adapter for connecting a towed agricultural implement to a drawbar hitch on towing vehicle using a pull though swivel hitch, a partial pull through swivel hitch or a non-pull through swivel hitch.

It is a still further object of the present invention to provide a swivel hitch adapter for connecting a towed agricultural implement to a drawbar hitch on a towing vehicle that is durable in construction, inexpensive of manufacture, carefree of maintenance, easily assembled, and simple and effective to use.

These and other objects are achieved in accordance with the instant invention by providing an adapter for connecting a swivel hitch for towing an agricultural implement to a drawing hitch on a towing vehicle that enables relative pitch and roll movement between the implement and vehicle at a single, pinned joint. A first embodiment incorporates elongated openings in a first portion of the hitch adapter through which a transversely aligned connection pin is positioned. The openings are sized to allow limited pin angular movement about a vehicular roll axis. A second portion of the hitch adapter is also connected to the connection pin and configured to allow limited relative angular movement about a transverse pitch axis. The connection between the first and second portions at the connector pin allows relative angular movement therebetween about generally co-planar pitch and roll axes. The connector pin is formed from a softer material than the surrounding first and second portions thereby providing an inexpensive and easily replaceable weak link in the hitch adapter assembly.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is an exploded perspective view of a first embodiment of the drawbar-mounted swivel hitch adapter;

FIG. 3 is an elevation view of the hitch adapter of FIG. 2;

FIG. 4 is a an exploded perspective view of a second embodiment of the drawbar-mounted swivel hitch adapter;

FIG. 5 is an elevation view of the hitch adapter of FIG. 4;

FIG. 6 is an elevation view of the hitch adapter of FIG. 4, shown with the towed implement rotated slightly about the vehicle roll axis;

FIG. 7 is a an exploded perspective view of a third embodiment of the drawbar-mounted swivel hitch adapter;

FIG. 8 is an elevation view of the hitch adapter of FIG. 7; and

FIG. 9 is an elevation view of the hitch adapter of FIG. 7, shown with the towed implement rotated slightly about the vehicle roll axis.

DESCRIPTION OF THE PREFERRED EMBODIMENT(S)

Figure 1:
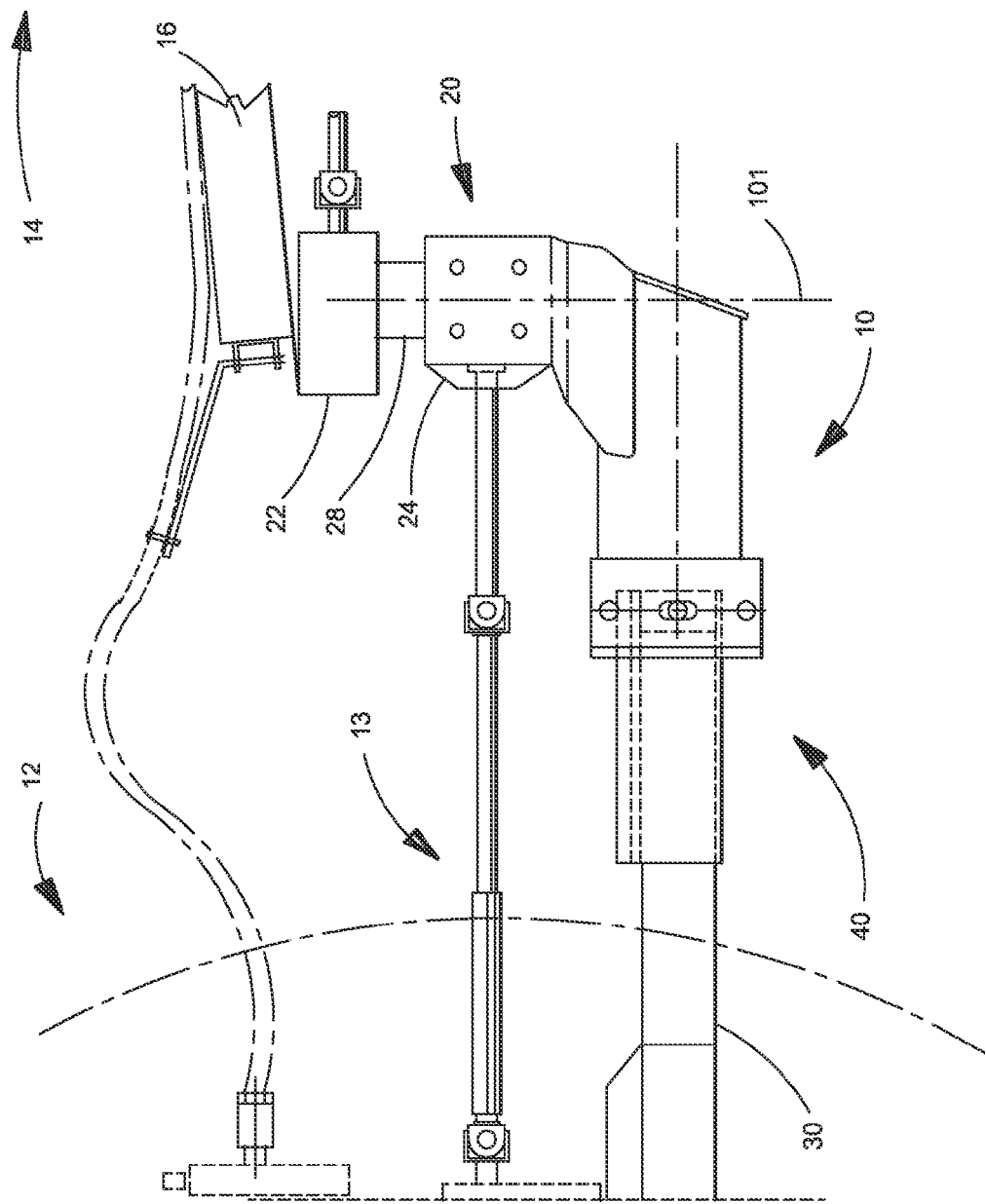
FIG. 1 is a partial elevation view of a drawbar-mounted swivel hitch adapter for connecting a towed agricultural implement to a towing vehicle incorporating one embodiment of the present invention.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring to FIG. 1, a swivel hitch 10 for connecting a towed agricultural implement 14 to a towing vehicle 12, such as a tractor is shown. Implement 14 features a forwardly directed draft tongue 16. Draft tongue 16 may be fixed to the implement or it may pivot to allow the implement track behind the tractor to be altered. The forward end of the draft tongue 16 is coupled through a swivel assembly 20 to the fixed drawbar hitch 30 of towing vehicle 12 by a drawbar adapter assembly 40 of the present invention. In a pull through swivel hitch type of implement shown, swivel assembly includes a power transmitting gearbox assembly 20. The gearbox assembly includes an upper gearbox 22 fixed to and rotating with the pivotal draft tongue 16. A lower gearbox 24 is connected to the upper gearbox by a swivel structure 28 that enables the lower gearbox to pivot about a generally vertical yaw axis 101 relative to the upper gearbox 22 and the draft tongue 16. As will become apparent, the benefits of the present invention are also realized in partial pull through as well as non-pull through swivel hitches.

Now referring to FIGS. 2 and 3, a first embodiment of the drawbar adapter assembly includes a first frame portion 50 which is selectively connectable to the drawbar hitch 30 of the tractor at a forwardly disposed distal end and to a second frame portion 60 at a rearward proximal end. Second frame portion is also connected to the draft tongue 16 of the implement. First frame portion 50 comprises generally planar spaced-apart and parallel top and bottom 54, 53 surfaces and perpendicularly arranged side surfaces 52 which form a generally rectangular cross-section opening for receiving a conventional drawbar hitch 30. Hitch pin 58 or similar known means are employed to retain the first portion 50 in position once installed on the drawbar hitch. Shims 57 and shim retainers 59 may be positioned used to assure an immovable connection of the first frame portion 50 to the drawbar hitch.

Second frame portion 60 includes a hitch connector 63 attached to a forwardly extending structural member 61. A rear connector 62 is configured for attachment to a lower gearbox 24 of a swivel hitch or to the draft tongue 16 of the implement dependent upon the specific type of swivel hitch (e.g., pull through, partial pull through, or non-pull through). The vertically aligned yaw axis 101 passes generally adjacent to the rear connector 62. Hitch connector 63 is configured as a forwardly open yoke for spanning the width of the first frame portion 50 side surfaces 52 adjacent to the proximal end of the first frame portion. A plurality of apertures 64 arranged on opposing legs 63 of the yoke are configured to receive a cross pin 70 in a generally horizontal and transverse alignment. Cross pin 70 features a circular cross sectional area and has a length to span between the opposing legs 63 of the hitch connector yoke. When the hitch adapter 40 is connected, cross pin 70 also engages transverse aperture 56 in the proximal end of first frame portion which allows the first and second frame portions 50, 60, to move angularly about the axis of the cross pin 70. Cross pin 70 is secured in the apertures 56, 64 by a well-known securing mechanism (not shown), such as a smaller pin through the cross pin to prevent axial movement through the apertures. The securing mechanism allows the cross pin 70 to be removed and replaced as necessary. In its transverse alignment, the cross pin 70 is aligned on the pitch axis 103 of the hitch adapter assembly 40.

Aperture 56 in first frame portion is an elongated oval opening having a minimum diameter sufficient to receive cross pin 70. The major diameter, oriented generally vertically, is substantially greater than the minimum diameter which allows cross pin 70 to move vertically in the transverse aperture 56, or as is necessary for the present invention, the ends of cross pin 70 may independently move vertically which allows the second frame portion to move angularly about the vehicle longitudinal axis, also referred to as the vehicle roll axis 102. Spacers 55 may be provided on the outboard surfaces of side surfaces 52 to provide additional clearance so that the yoke legs 63 are not impeded from movement by contact with the side surfaces 52. The combined movement at the cross pin 70 allows the hitch adapter assembly to accommodate relative angular movement about both the pitch (transverse horizontal) and roll (longitudinal horizontal) axes using a connection in which the two axes are co-planar.

Cross pin 70 is fabricated as a weak link in the connection of the first and second frame portions since the pin is easily and more economically replaced that the hitch adapter. It is preferable to select a material for the cross pin that is relatively soft compared to the materials forming the frame portions. Alternatively, maintaining the diameter of the cross pin to that just sufficient to handle the anticipated loads while providing greater strength in the apertures and surrounding material, the cross pin will fail first in over-stress conditions.

A second embodiment of the invention is shown in FIGS. 4 through 6 wherein the proximal end of first frame portion 50 is configured at a yoke 152 having a pair of spaced apart and opposing yoke legs 155. Each of the yoke legs includes an aperture 156 for receiving cross pin 70. The configuration of apertures 156 is similar to the aperture 56 previously described in connection with the first embodiment. Second frame portion 60 includes a connector body 163 having a fixed downwardly open hook 167 configured to rest upon the cross pin 70 between the yoke legs 155. A pivoting pawl 165 is positioned adjacent and opposite to the hook 167 opening on the connector body 163. The pawl remains open by its own weight during hookup. Insertable pins 169 are provided to secure the pawl in the closed position. When the pawl is in the closed position, the hook 167 is prevented from being disengaged from the cross pin 70, but allowed angular movement around the longitudinal axis of the cross pin. Angular movement of the cross pin 70 about the roll axis 102 is allowed by movement of the cross pin in apertures 156 in the first frame portion. As with the first embodiment, the hitch adapter assembly 40 accommodates relative angular movement about both the pitch (transverse horizontal) and roll (longitudinal horizontal) axes using a connection in which the two axes are co-planar.

Finally referring to FIGS. 7 through 9 wherein a third embodiment of the hitch adapter assembly 40 is shown having a similar hook and yoke arrangement as that described in the second embodiment above. In the third embodiment, the portions of the hook 267 and the pawl 265 that are in contact with the cross pin 70 are convexly shaped to allow the connector body 163 to rock on the cross pin 70, thereby allowing angular movement of the second portion about the vehicular roll axis. Apertures 256 in the yoke 152 are circular and sized to allow insertion of cross pin 70, but to preclude rocking angular movement about the vehicular roll axis 102. Relative movement between the first and second frame portions 60, 60 about the vehicular roll axis is enabled by the contour of the hook 267 and pawl 265 contact surfaces with the cross pin 70. Angular movement about the vehicular pitch axis 103 is, as on other embodiments, permitted by the circular cross-section of the cross pin 70.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A drawbar adapter assembly for connecting a towed implement having a swivel hitch assembly to a drawbar hitch of a towing vehicle, the adapter assembly comprising:
   a first frame portion having a distal end with a connector and a generally opposing proximal end, the connector including a receptacle configured to receive within a portion of the drawbar hitch;
   a horizontal transverse slot-like aperture in the proximal end, the aperture having a width dimension and a height dimension that is greater than the width dimension;
   a second frame portion having a hitch connector at a forward end and a rearwardly disposed connector to the swivel hitch; and
   a horizontal cross pin extending through the transverse aperture,
   wherein the cross pin is configured for engagement with the hitch connector in a manner allowing relative angular movement between the first frame portion and the second frame portion about a generally horizontal pitch axis by rotation about a longitudinal axis of the cross pin and relative angular movement between the first frame portion and the second frame portion about a perpendicular, co-planar roll axis by angular deflection of the cross pin within the height dimension of the aperture.

2. The adapter assembly of claim 1, wherein the hitch connector is an open yoke having generally opposing and spaced-apart legs for positioning on opposing lateral sides of the proximal end of the first frame portion, each leg having a circular aperture through which the cross pin may be inserted to connect the first frame portion to the second frame portion.

3. A drawbar adapter assembly for a towing vehicle having a drawbar hitch for connecting a towed implement having a swivel hitch assembly to the towing vehicle, the adapter assembly comprising:
   a first frame portion having a distal end with a connector for securing the adapter assembly to the drawbar hitch and a generally opposing end;
   horizontal transverse slot-like aperture in the proximal end the aperture having a width dimension and a height dimension that is greater than the width dimension;
   a second frame portion having a hitch connector at a forward end and a rearwardly disposed connector to the swivel hitch; and
   a horizontal cross pin extending through the transverse aperture,
   wherein the cross pin is engaged by the hitch connector in a manner allowing relative angular movement between the first frame portion and the second frame portion about a generally horizontal pitch axis by rotation about a longitudinal axis of the cross pin and relative angular movement between the first frame portion and the second frame portion about a perpendicular co-planar roll axis by angular deflection of the cross pin within the height dimension of the aperture; and
   wherein the cross pin material is softer than the first and second frame portion material.

4. The adapter assembly of claim 3, wherein the hitch connector includes a fixed, downwardly open hook for engaging the cross pin and a pawl moveable from an open position to a closed position to secure the hook on the engaged cross pin.

5. The adapter assembly of claim 4, wherein the hook and the pawl each further comprise a convexly shaped bearing surface for adjacent contact with the cross pin aligned to permit limited angular movement of the second frame portion about the vehicular roll axis relative to the cross pin.

6. The adapter assembly of claim 5, wherein the width dimension in the proximal end aperture is generally equal to the height dimension.

7. A drawbar adapter assembly for connecting a towed implement having a swivel hitch assembly to a drawbar hitch of a towing vehicle, the adapter assembly comprising:
   an elongate first frame portion having a connector for securing to the drawbar hitch the connector including a receptacle having interior surfaces and configured for receiving at least a portion of the drawbar hitch within the receptacle;
   a second elongate frame portion having a swivel hitch connected at a rearward end;
   a first aperture in the first frame portion aligned generally horizontally;
   a second aperture in the second frame portion spaced apart from the swivel hitch assembly; and
   an elongate, generally cylindrical cross pin simultaneously engaging the first and second apertures;
   wherein the configuration of the first and second apertures allows limited relative angular movement between the first frame portion and the second frame portion about co-planar perpendicular pitch and roll axes.

8. The adapter assembly of claim 7, wherein relative movement between the first and second frame portions about the pitch axis is by pivotal movement about the cross pin longitudinal axis and relative movement between the first and second frame portions about the roll axis is by simultaneous angular movement of the cross pin and either the first or the second frame portion about the roll axis.

9. The adapter assembly of claim 8, wherein the first aperture is a slot-like aperture having a height dimension that is greater than a width dimension.

10. The adapter assembly of claim 8, wherein the first frame portion has an open yoke with spaced apart legs, the cross pin spans the legs, and the second frame portion has a downward opening hook with a moveable pawl to engage the cross pin between the legs.

11. The adapter assembly of claim 10, wherein the first aperture is a slot-like aperture having a height dimension that is greater than a width dimension.

12. The adapter assembly of claim 10, wherein the hook and the moveable pawl each further comprise a convex bearing surface for adjacent contact with the cross pin aligned to permit limited angular movement of the second frame portion about the vehicular roll axis relative to the first frame portion and the cross pin.

13. The adapter assembly of claim 7, wherein the cross pin material is softer than the first or second frame portion materials.

* * * * *